Feb. 24, 1931.  C. A. LOWE  1,793,944
ANTISKID APPLIANCE FOR VEHICLE WHEELS
Filed Feb. 6, 1930  2 Sheets-Sheet 2
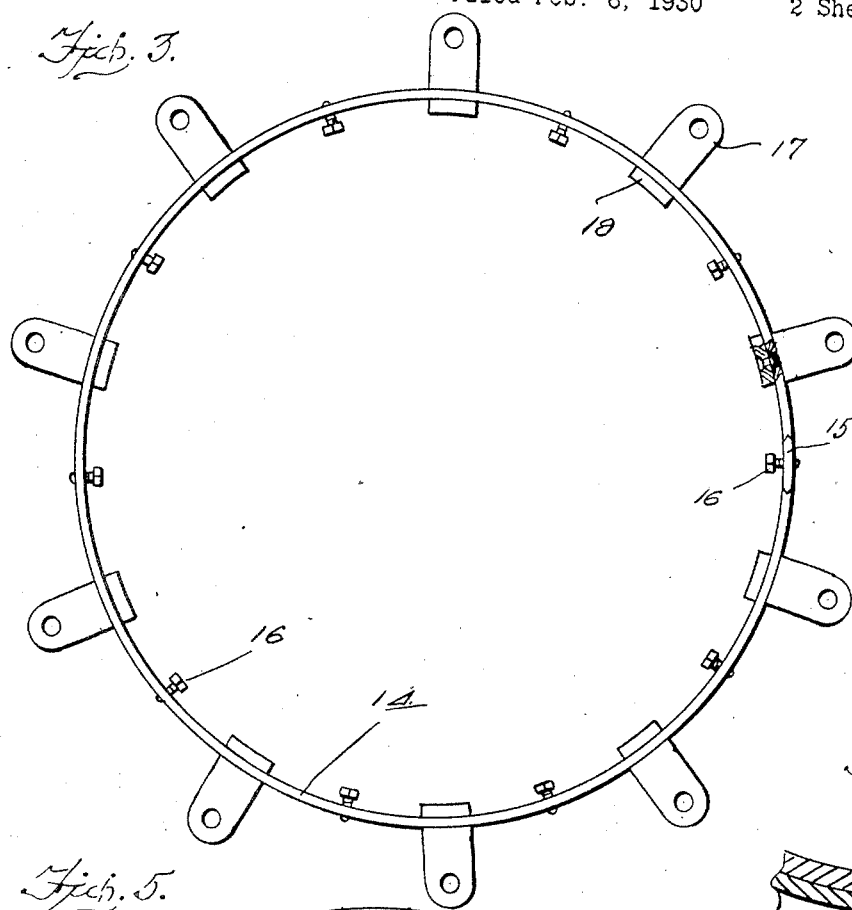
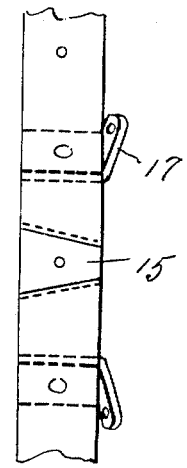
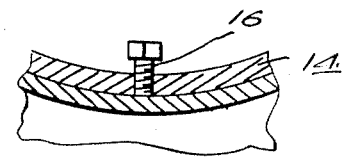
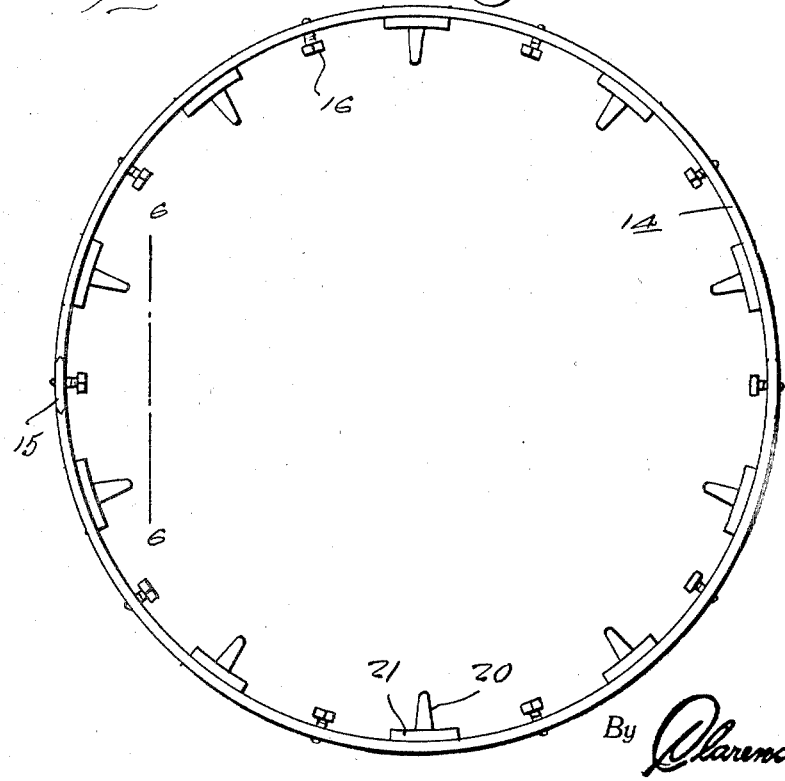
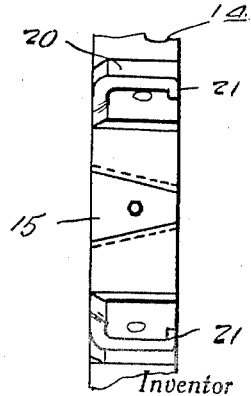
Inventor
C. A. Lowe
By Clarence A. O'Brien
Attorney Patented Feb. 24, 1931

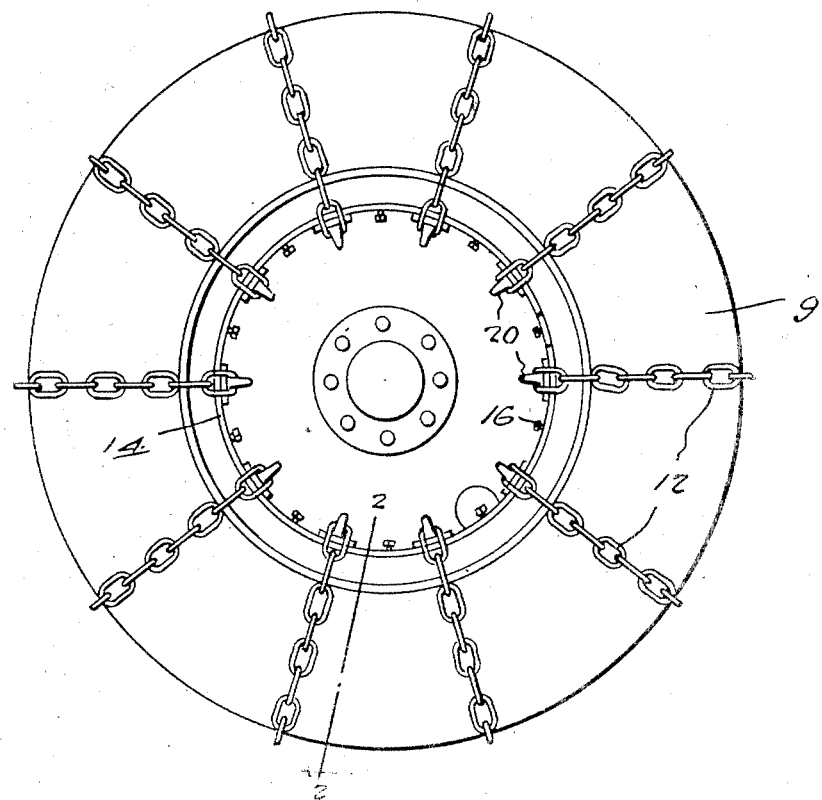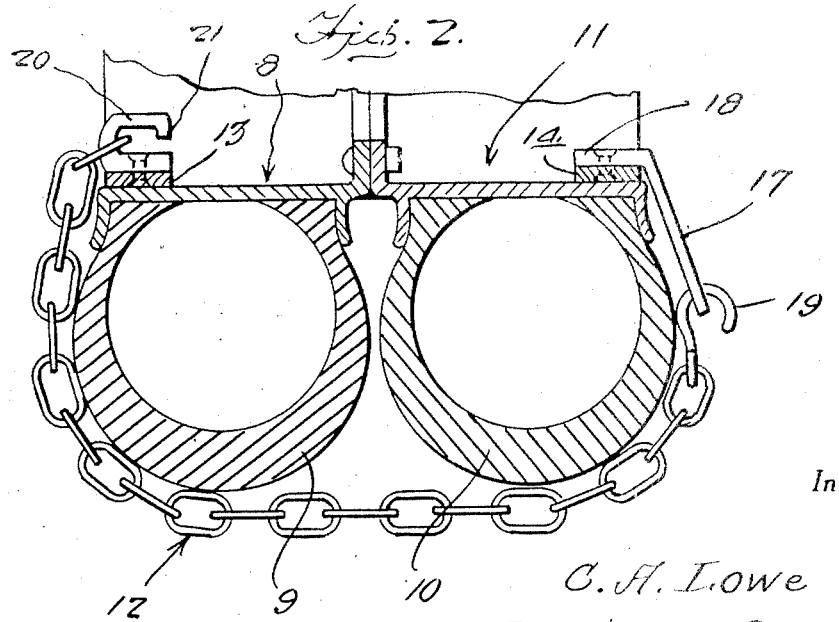

1,793,944

UNITED STATES PATENT OFFICE

CLOYD A. LOWE, OF DAYTON, OHIO

ANTISKID APPLIANCE FOR VEHICLE WHEELS

Application filed February 6, 1930. Serial No. 426,378.

This invention relates to an improved motor vehicle wheel appliance in the nature of a novel anti-skid structure made to provide a practical attachment for pneumatic tired wheels of the duplex type. It is a matter of common knowledge that wheels of this construction embody a double rim and a pair of companion tires. Inasmuch as some difficulty has been encountered with the provision of feasible means for preventing skidding of tires of this type, I have developed what I believe to be a suitable and efficient structure which will fill the requirements of a device of this class in a highly satisfactory manner.

In the drawings:

Figure 1 is an outside elevational view of a duplex vehicle wheel equipped with my improved invention.

Figure 2 is an enlarged cross sectional view on the line 2—2 of Figure 1.

Figure 3 is an elevational view of a lug equipped attaching ring.

Figure 4 is a fragmentary elevational view of a portion thereof.

Figure 5 is a view similar to Figure 3, showing the complemental attaching ring.

Figure 6 is a fragmentary elevational view of a portion of the structure seen in Figure 5.

Figure 7 is a longitudinal sectional view showing the manner in which set screws are used for holding the ring in place on the tire rim.

In Figure 2 the reference character 8 designates the outer wheel rim carrying one of the tires 9. The remaining tire 10 is carried on the companion rim 11. I provide a plurality of detachable anti-skid chains 12 and these are composed of interconnected links adapted to be fastened to the tire rim. Special means is provided for accomplishing this end.

In accomplishing this particular feature of the invention, I have found it practical and expedient to employ a pair of attaching rings, the outer one of which is designated by the numeral 13, and the inner one by the numeral 14. Each rim is in the nature of an annular band, and is of the approximate width shown in Figure 2 and is arranged within the inner circumference of the complemental rim 8 or 11 as the case may be.

As shown in Figures 3 and 6, each ring is of split form, that is, the ends are separated and are formed with V-shaped grooves providing key-ways for reception of the correspondingly shaped edges on the expanding and retaining wedge 15. Moreover, set screws 16 are provided on each of the rings to bind against the tire rim as seen in Figure 7, to hold the rings in place. The inner ring 14 is provided with apertured lugs 17 whose laterally directed end portions 18 are riveted or otherwise fastened to the ring as shown. This disposes the apertured ends alongside of the inner tire 10 to receive the attaching hook 19.

Hooks 20 having laterally directed retaining bills 21 are fastened to the inner periphery of the ring 13. Thus one of the links of the chain 12 is connected with its complemental hook 20 and the other hook is engaged with the opposite lug 17.

From the description it is obvious that the rings 13 and 14 are placed within the tire rims 8 and 11 as seen in Figure 2, and the set screws 16 are tightened, after the expanding wedges 15 have been put in place. This then, arranges the lugs and hooks in proper relationship to receive the ends of the antiskid chain 12. The chain extends across the tread portion of the tires 9 and 10.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. As a new product of manufacture, an attaching ring comprising a flat metal band adapted to fit within a tire rim, the ends of said band being formed with grooves and an expanding wedge removably arranged in said grooves, a plurality of circumferentially arranged set screws for retaining said ring in place, and chain anchoring elements fastened on the inner periphery of the ring at circumferentially spaced points.

2. As a new product of manufacture, an attaching ring comprising a flat metal band adapted to fit within a tire rim, the ends of said band being formed with grooves and an expanding wedge removably arranged in said grooves, a plurality of circumferentially arranged set screws for retaining said ring in place, and chain anchoring elements fastened on the inner periphery of the ring at circumferentially spaced points, said elements being in the form of inturned hooks having laterally directed retaining extremities.

3. As a new product of manufacture, an attaching ring comprising a flat metal band adapted to fit within a tire rim, the ends of said band being formed with grooves and an expanding wedge removably arranged in said grooves, a plurality of circumferentially arranged set screws for retaining said ring in place, and chain anchoring elements fastened on the inner periphery of the ring at circumferentially spaced points, said elements being in the nature of substantially L-shaped lugs, the short arm of the lug being fastened to the inner periphery of the ring and the long arm having a terminal aperture for the reception of a chain hook.

In testimony whereof I affix my signature.

CLOYD A. LOWE.